April 13, 1926.

G. N. RUTTLE

CIRCUIT CLOSING DEVICE

Filed Nov. 19, 1923

1,580,169

INVENTOR
G. N. Ruttle.
BY J. Edward Maybee.
ATTY.

Patented Apr. 13, 1926.

1,580,169

UNITED STATES PATENT OFFICE.

GEORGE N. RUTTLE, OF MOUNT DENNIS, ONTARIO, CANADA, ASSIGNOR OF ONE-FOURTH TO EDWARD JAMES MAHONY, OF MOUNT DENNIS, ONTARIO, CANADA.

CIRCUIT-CLOSING DEVICE.

Application filed November 19, 1923. Serial No. 675,721.

*To all whom it may concern:*

Be it known that I, GEORGE N. RUTTLE, of the village of Mount Dennis, in the county of York, Province of Ontario, Canada, a subject of the King of Great Britain, have invented certain new and useful Improvements in Circuit-Closing Devices, of which the following is a specification.

This invention relates to circuit closing devices particularly adapted for use with indicators for indicating the intended changes of direction of a vehicle and my object is to provide a circuit closing device which will permit the indicator to remain lit while the steering mechanism is being operated to turn a corner and which will cut out the lights when the wheel is turned in the opposite direction to straighten the course of the vehicle after the corner has been turned.

I attain my objects by means of the constructions hereinafter described and illustrated in the accompanying drawings in which—

Figures 1, 2:
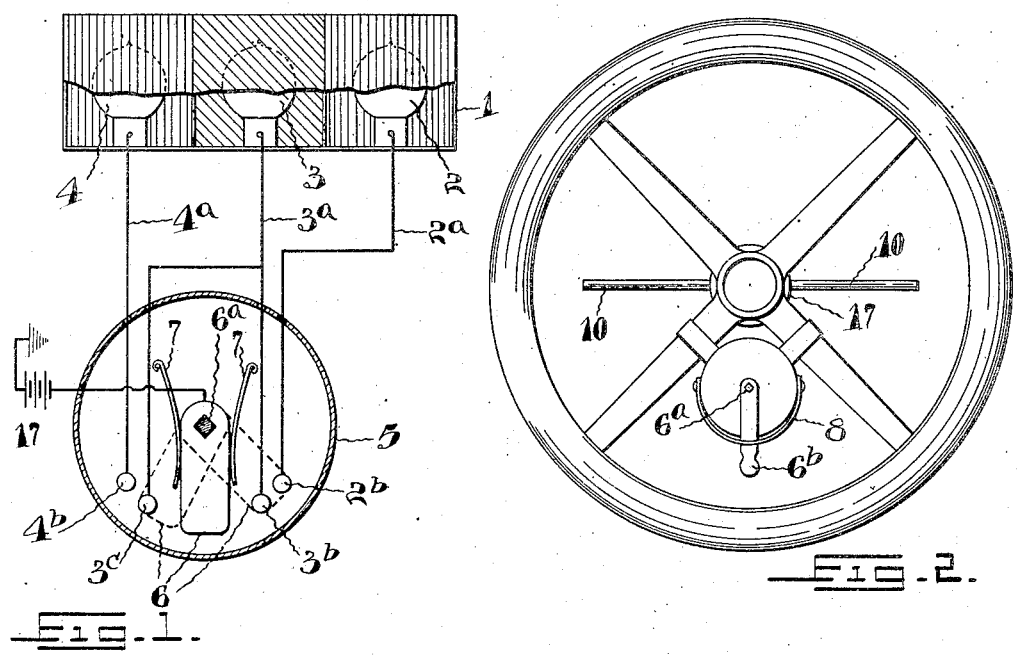

Fig. 1 is a rear view of the indicator, partly broken away and showing the switch thereof in horizontal section;

Fig. 2 a diagrammatic view of the switch and steering wheel; and

Figure 3:
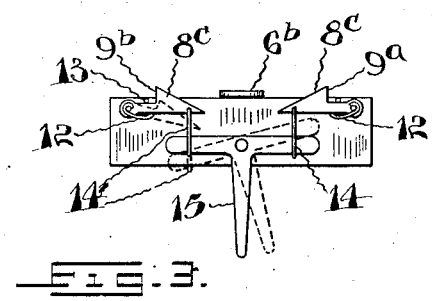

Fig. 3 a front elevation of my device.

One is a casing which is partitioned off to form three compartments in which the electric bulbs 2, 3 and 4 are suitably carried. The casing is provided with glazed rear and front sides and the portions of each glass behind and in front of the different compartments are colored to contrast with the portions in front and behind the adjacent compartment. In other words the glass in front and behind the compartment, in which the end light 2 is carried, is colored red; the glass in front and behind the compartment, in which the central light 3 is carried, is colored green; and the glass in front and behind the compartment, in which the end light 4 is carried, is colored red.

The bulbs 2, 3 and 4 are respectively connected by wires $2^a$, $3^a$ and $4^a$ to the fixed contacts $2^b$, $3^b$ and $3^c$, and $4^b$ of a switch box 5. It will be noted that the contacts $2^b$ and $3^b$, $3^c$ and $4^b$ are so placed that a pivoted switch arm 6 may be brought into contact with either pair of contacts for a purpose hereinafter described. The switch arm 6 is connected to a suitable source of electrical supply 17 which is grounded to the frame of the vehicle and the electric bulbs are also suitably grounded to the frame.

From the above description it is obvious that when the switch arm is moved to the right or left to contact with either of the contacts $3^b$ or $3^c$ the centre bulb 3 will be lit to show a green light, which might be used when the vehicle is parked. If the switch arm is moved a little farther to the right or left to also contact with either one of the contacts $2^b$ or $4^b$ the red light 2 or 4 will be lit in conjunction with the central light 3. From this it follows that whichever red light is lit in conjunction with the centre green light an indication of the direction the driver of the vehicle intends to turn will be given, the red on the left of the green light indicating a left hand turn and the red on the right of the green indicating a right hand turn.

It is desirable to provide means for releasably locking the switch arm 6 in either its right or left turn indicating positions and for automatically moving it to its "off" position when the vehicle steering mechanism has been shifted a predetermined minimum. The switch arm 6 is secured to a pivot pin $6^a$ which is suitably journalled in the top and bottom of the switch box 5. To the upper end of this pin which extends through the top of the switch box is secured an arm $6^b$ which extends beyond the side thereof so that it may be readily engaged by the driver's hand when it is desired to operate the switch. To enable the driver to reach the arm $6^b$ without removing either hand from the steering wheel the switch box is suitably clamped to the steering wheel. The switch arm 6 is normally held, by means of flat springs 7, in its "off" or open position.

To permit the desired lights to remain lighted while the wheel is being turned to turn a corner and to cut out the lights when the wheel is turned in the opposite direction to straighten the course of the vehicle after the corner has been turned I provide the following means. A pair of members $8^c$ are pivoted on the switch box and are provided with shoulders $9^a$ and $9^b$ adapted to engage the arm $6^b$, the shoulders $9^a$ being adapted to hold the switch arm 6 in contact with the contacts 2ᵇ and 3ᵇ and the shoulder 9ᵇ being adapted to hold the arm 6 in contact with the contacts 3ᶜ and 4ᵇ. These members have their upper surfaces inclined whereby the movement of the arm 6ᵇ in either direction will cause one of the members to be depressed against the tension of a spring 12 which tends to hold the member in position for its shoulder to engage the arm 6ᵇ. Stops 13 are provided for limiting the upper movement of the members. The members are provided with loops 14 which depend therefrom and through these loops are passed the oppositely directed arms of a T-shaped actuator 15. This actuator is fulcrumed on the switch box and is adapted to be engaged by either one of two members 10. These members are adjustably secured by a clamp 17ᵃ to the steering wheel column. From this description it is evident that if the actuator be rocked in either direction, by means of the members 10, that one of the members 8ᶜ will be pulled downwardly to disengage the arm 6ᵇ and the other member will remain in its operative position as the raised end of the actuator merely passes through its loop.

Assuming it is desired to turn the vehicle round a corner, say to the right, the arm 6ᵇ is just moved to the right to engage the shoulder 9ᵃ and thus light the bulbs 2 and 3. When the corner is reached the wheel is turned to the right and the fixed member 10, at the left of the switch box 5, engages the actuator 15 to move the latter as indicated in dotted lines in Fig. 3. This movement causes the arm of the actuator below the shoulder 9ᵃ to slide upwardly in its loop without moving the latter. The shoulder 9ᵇ is depressed by this movement of the actuator. When the corner has been turned the wheel is turned to the left to straighten the course of the vehicle and the said member 10, which is now at the right of the switch box, again engages the actuator 15 to rock it in a direction opposite to the first direction and thus cause the shoulder 9ᵃ to be depressed to disengage the arm 6ᵇ. The springs 7 then return the switch arm 6 to its neutral position.

What I claim is:—

1. The combination with a vehicle provided with steering means including a movable and a stationary part, of a switch box adapted to be clamped on one part of the steering means and provided with a pair of spaced contacts; a pivoted switch arm adapted to engage either one of the contacts; yielding means tending to hold the arm out of engagement with the contacts and centrally locate it relative thereto; a pair of members pivoted on the switch box, each member being provided with a shoulder, each shoulder adapted to releasably hold the arm in engagement with one of the contacts; and means including a plurality of members carried on the other part of the steering means for actuating the locking members to release the switch arm and adapted to permit the movable part of the steering means to be first turned in one direction and then in the opposite direction before releasing the said arm.

2. The combination with a vehicle provided with steering means including a movable and a stationary part, of a switch box adapted to be clamped on one part of the steering means and provided with a pair of spaced contacts; a pivoted switch arm adapted to engage either one of the contacts; yielding means tending to hold the arm out of engagement with the contacts and centrally locate it relative thereto; a pair of members pivoted on the switch box, each member being provided with a shoulder, each shoulder adapted to releasably hold the arm in engagement with one of the contacts; an actuator of substantially T-shape pivoted on the switch box and having its oppositely directed arms connected to the locking members, the connections being adapted to permit either one of the arms of the actuator to rock in one direction without disturbing its locking member; and a plurality of members carried on the other part of the steering means and adapted to engage the actuator.

3. The combination with a vehicle provided with steering means including a movable and a stationary part, of a switch box adapted to be clamped on one part to the steering means and provided with a pair of spaced contacts; a pivoted switch arm adapted to engage either one of the contacts; yielding means tending to hold the arm out of engagement with the contacts and centrally locate it relative thereto; a pair of members pivoted on the switch box, each member being provided with a shoulder, each shoulder adapted to releasably hold the arm in engagement with one of the contacts; a loop depending from each of the said members; an actuator of substantially T-shape having its oppositely directed arms passing through the said loops, the actuator being pivoted on the switch box; and a plurality of members carried on the other part of the steering means and adapted to engage the actuator to cause either of the oppositely directed arms thereof to actuate one of the locking members to its releasing position without disturbing the other locking member.

Signed at Toronto, Canada, this 16th day of October, 1923.

GEORGE N. RUTTLE.